(12) United States Patent
Conroy et al.

(10) Patent No.: US 7,716,290 B2
(45) Date of Patent: May 11, 2010

(54) SEND BY REFERENCE IN A CUSTOMIZABLE, TAG-BASED PROTOCOL

(75) Inventors: David G. Conroy, El Granada, CA (US); Georgios Chrysanthakopoulos, Redmond, WA (US); Henrik F. Nielsen, Huntspoint, WA (US)

(73) Assignee: Microsoft Corporation, Redmond, WA (US)

( * ) Notice: Subject to any disclaimer, the term of this patent is extended or adjusted under 35 U.S.C. 154(b) by 1170 days.

(21) Appl. No.: 10/717,741

(22) Filed: Nov. 20, 2003

(65) Prior Publication Data

US 2005/0114455 A1 May 26, 2005

(51) Int. Cl.
*G06F 15/16* (2006.01)
(52) U.S. Cl. .................. 709/206; 709/207; 711/101
(58) Field of Classification Search .......... 709/206, 709/207; 711/101
See application file for complete search history.

(56) References Cited

U.S. PATENT DOCUMENTS

| 5,781,901 | A | 7/1998 | Kuzma et al. | |
|---|---|---|---|---|
| 6,314,402 | B1 * | 11/2001 | Monaco et al. | 704/275 |
| 6,477,576 | B2 * | 11/2002 | Angwin et al. | 709/217 |
| 6,505,236 | B1 | 1/2003 | Pollack | |
| 2003/0009571 | A1 * | 1/2003 | Bavadekar | 709/203 |
| 2003/0079030 | A1 * | 4/2003 | Cocotis et al. | 709/229 |
| 2003/0191800 | A1 | 10/2003 | Challenger | |

OTHER PUBLICATIONS

Nakazawa, et al. "A Pluggable Service-to-Service Communication Mechanism for Home Multimedia Networks". ACM Multimedia '02. Dec. 1-6, 2002.*
Bayardo, et al. "YouServ: A Web-Hosting and Content Sharing Tool for the Masses". ACM WWW 2002, May 7-11, 2002.*
Communication pursuant to Article 96(2) EPC (Examination Report) dated Nov. 18, 2005, EP Application No. 04 025 693.5.
Gudgin, M., et al., "SOAP Version 1.2 Part 1: Messaging Framework," XP002318628, retrieved on Jun. 24, 2003, from URL:http://www.w3.org/TR/soap12-part1.
Gudgin, M., et al., "SOAP Version 1.2 Part 2: Adjuncts," XP002318629, retrieved on Jun. 24, 2003, from URL:http://www.w3.org/TR/soap12-part2.
Nielsen, H.F., et al., "Direct Internet Message Encapsulation (DIME), draft-nielsen-dime-02.txt," Internet Engineering Task Force, Jun. 17, 2002, XP015004607.
Zhang, J., et al., "A SOAP-Oriented Component-Based Framework Supporting Device-Independent Multimedia Web Services," Multimedia Software Engineering Proceedings, Fourth International Symposium, Piscataway, NJ, Dec. 11-13, 2002.

* cited by examiner

*Primary Examiner*—Jungwon Chang
(74) *Attorney, Agent, or Firm*—Lee & Hayes, PLLC

(57) ABSTRACT

In various embodiments of the present invention, a customizable, tag-based message is a unit of information transmitted electronically from one device to another that may contain one or more references to one or more pieces of information without the need for these pieces of information to be embedded in the customizable, tag-based message. The customizable, tag-based message can comply with any suitable protocol. One suitable protocol includes a customizable, tag-based protocol, such as SOAP, but other protocols can be used.

22 Claims, 16 Drawing Sheets

```
<SOAP:ENVELOPE XMLNS:S="HTTP://WWW.W3.ORG/2003/05/SOAP-ENVELOPE">
<SOAP:HEADER>
<R:RDMA XMLNS:R="HTTP://MAGNET/CONTRACTS/2003/08/RDMA.XSD">
<R:SERVICEINFO SERVICE="RDMAP:09233523-345B-4351-B623-5DSF35SGS5D6">
<R:HOST>EXAMPLE.COM</R:HOST>
<R:PROTOCOL>6</R:PROTOCOL>
<R:PORT>808</R:PORT>
<R:CONTRACT>HTTP://EXAMPLE.ORG/RDMA/READ</R:CONTRACT>
<R:TAG>983452346</R:TAG>
<R:LENGTH>231245646</R:LENGTH>
</R:SERVICEINFO>
</R:RDMA>
</SOAP:HEADER>
<SOAP:BODY>
<M:MULTIMEDIA XMLNS:M="HTTP://EXAMPLE.ORG/MULTIMEDIA">
<M:VIDEO>RDMAP:09233523-345B-4351-B623-5DSF35SGS5D6</M:VIDEO>
</M:MULTIMEDIA>
</SOAP:BODY>
</SOAP:ENVELOPE>
```

Fig. 3.

SEND BY REFERENCE IN A CUSTOMIZABLE, TAG-BASED PROTOCOL

FIELD OF THE INVENTION

The present invention relates generally to customizable, tag-based messages, and more particularly, to a means of sending information by reference in customizable, tag-based messages among services via a customizable, tag-based protocol.

BACKGROUND OF THE INVENTION

SOAP originally stood for "Simple Object Access Protocol," but over time, SOAP has developed away from merely accessing objects and toward a generalized extensible messaging framework. Although a popular network representation for SOAP is an XML-based protocol that is designed to exchange structured and typed information on the Web, SOAP can be used in combination with a variety of existing Internet protocols and formats and can support a wide range of applications from messaging systems to remote procedure calls (RPCs).

Simply put, SOAP defines a way to move messages from point A, such as a message sender 102, to point B, such as a message receiver 104. See FIG. 1. SOAP defines a model for processing individual, one-way messages. One can combine multiple messages into an overall message exchange. FIG. 1 illustrates a system 100 where a simple one-way message is sent by the message sender 102, and the message sender 102 does not require a response from the message receiver 104. The receiver 104 could, however, send a response back to the message sender 102. SOAP allows for any number of message exchange patterns, of which request/response is just one. Other examples include notifications, and long-running peer-to-peer conversations.

The SOAP messaging framework facilitates exchanging XML messages in heterogeneous environments where interoperability has long been a difficult problem to solve. The SOAP messaging framework defines a suite of XML elements for packaging arbitrary XML messages, such as the XML message 106, for transport between systems, such as the message sender 102 and the message receiver 104. The framework consists of a few core XML elements: envelope, header, and body.

The envelope element (described by a beginning tag 106A <SOAP:ENVELOPE> and its companion ending tag 106J </SOAP:ENVELOPE>) is always the root element of a SOAP message, such as a SOAP message 106. This makes it easy for the message sender 102 and the message receiver 104 to identify SOAP messages by simply looking at the name of the root element.

The envelope element contains an optional header element, which is described by a beginning tag 106C <SOAP:HEADER> and its companion ending tag 106E </SOAP:HEADER>. The header element, unlike the body element, is a generic container for control information. It may contain any number of elements from any name space (other than the SOAP name space). Elements placed in the header element are referred to as header blocks. As with other protocols, header blocks contain information that influences payload processing. Header blocks can also be annotated with a global SOAP attribute named mustUnderstand to indicate whether or not the receiver is required to understand the header before processing the message as well as other attributes.

The header element is followed by a mandatory body element, which is described by a beginning tag 106F <SOAP:BODY> and its companion ending tag 106H </SOAP:BODY>. The body element represents the message payload, and as a payload, the body element is a generic container that is capable of containing any number of elements from any name space. This is ultimately where data will be contained when the message sender 102 attempts to send such data embedded in the SOAP message 106 to the message receiver 104. This minimal design of header and body elements to respectively contain control and data information in a SOAP message helps to foster a simple architecture allowing heterogeneous environments to communicate. However, such a design also hinders the application of the SOAP protocol in data intensive communications. FIG. 1 illustrates this problem and other problems in greater detail.

Suppose that the message sender 102 is a personal digital assistant, which is a light-weight computer designed to provide specific functions like personal organization (calendar, note-taking, database, calculator, and so on) as well as communications. More advanced personal digital assistants also offer multimedia features, such as music playing. Many personal digital assistants rely on a pen or other pointing device for input instead of a keyboard or a mouse, although some offer a keyboard too small for touch typing to use in conjunction with a pen or pointing device. For data storage, a personal digital assistant relies on flash memory instead of power-hungry disk drives. Suppose also that the message receiver 104 is a pair of intelligent loudspeakers, which are devices that accept messages containing a digital encoding of sound and generate sounds loud enough to be heard by the user of the message receiver 104.

Consider a situation where the message sender 102 (a personal digital assistant that can play music) sends a song in digital audio form to the message receiver 104. Using the SOAP protocol, the message sender 102 inserts into the body element (described by tags 106F, 106H) ASCII data that represents the digital audio, which in turn represents the original song. Whereas digital audio is typically compressed using a coding scheme, such as MP3, to shrink the size of the digital audio file without seriously degrading the quality of the sound, ASCII is not a compressed scheme. While not a requirement, the vast majority of SOAP messages are exchanged as an XML/1.0 document which uses some text-oriented encoding, typically UTF-8 or UTF-16. Most digital audio files are compressed to average about three megabytes of data. The conversion of those digital audio files to a representation supported by XML/1.0 so that they can be embedded in SOAP messages would cause the size of SOAP messages to be prohibitively large.

However, even more important is the problem that if the data is included in the body element, then the data must be exchanged, in its entirety, before message processing at the receiver can begin. There are many situations in which this is undesirable. The receiver may not be able to process the data in the form supplied by the sender, and will request that the sender supply the data in a different form; if the data is included in the body of the message then the data will end up being sent twice. The receiver may not need all of data in the message; if the data is included in the body of the message then the receiver has no choice but to accept all of the data and discard the portions it does not need. Or a fault in the network may cause the message to be garbled after the bulk of it has been exchanged; if the data is included in the body of the message then there is no alternative to exchanging the message again, in its entirety. In all of these situations including the data in the body of the message results in needless consumption of network resources.

Large SOAP messages due to bulky pieces of data in the body element cause lackluster performance in the sending process, the transferring process, and the receiving process. While the SOAP protocol has helped to enable rich and automated Web services based on a shared and open Web infrastructure, SOAP messages were not designed originally for transferring bulky pieces of data, such as multimedia data. Without a solution to separate the control information in the header of a SOAP message from the data information in the body of the SOAP message, the SOAP protocol will be limited in its application, and users may eventually no longer trust the system 100 to provide a desired computing experience because of lackluster performance, causing demand for the system 100 to diminish from the marketplace. Thus, there is a need for a method and a system for sending information by reference while avoiding or reducing the foregoing and other problems associated with existing systems.

SUMMARY OF THE INVENTION

In accordance with this invention, a system, method, and computer-readable medium for sending by reference in a customizable, tag-based protocol is provided. The system form of the invention includes a networked system. The networked system comprises a message sender for sending a customizable, tag-based message, which includes a reference to a first buffer. The networked system further comprises a message receiver for receiving the customizable, tag-based message. The message receiver is capable of processing the reference in the customizable, tag-based message to cause either a piece of information stored in the first buffer to transfer to a second buffer or a piece of information stored in the second buffer to transfer to the first buffer.

Another system form of the invention includes a networked system. The networked system comprises a message sender for sending a customizable, tag-based message, which includes a reference to a first buffer. The networked system further comprises an intermediary for intercepting the customizable, tag-based message. The networked system further comprises a message receiver for receiving the customizable, tag-based message from the intermediary. The message receiver is capable of processing the reference in the customizable, tag-based message to cause either a piece of information in another buffer to transfer to a second buffer or a piece of information stored in the second buffer to transfer to the another buffer.

A computer-readable medium form of the invention includes a customizable, tag-based data structure stored on the computer-readable medium for use by a networked system to process the act of sending information by reference. The data structure comprises a header tag that is indicative of control information. The header tag includes a service tag that is indicative of a service for representing a buffer. The service tag includes a URI attribute that is indicative of a URI of the service representing the buffer and an identifier attribute that is associated with the buffer through the URI of the service. The data structure further comprises a body tag that is indicative of data information, the body tag being capable of using the identifier attribute to refer to the buffer.

An additional system form of the invention includes a networked system. The networked system comprises a central processing unit, a piece of memory that includes a first buffer, and a network interface card that is capable of processing a reference in a customizable, tag-based message to cause either a piece of information stored in the first buffer to transfer to another buffer or a piece of information stored in the another buffer to transfer to the first buffer without requiring the central processing unit to execute copy instructions.

A method form of the invention includes a computer-implemented method for sending by reference in a customizable, tag-based protocol. The computer-implemented method comprises preparing a customizable, tag-based message to include a transfer context. The transfer context includes a reference to a first buffer for storing a piece of information without having to embed the piece of information in the customizable, tag-based message. The computer-implemented method further comprises sending the customizable, tag-based message to the network.

Another computer-readable medium form of the invention includes a computer-readable medium having computer-executable instructions for implementing a method for sending by reference in a customizable, tag-based protocol. The method comprises preparing a customizable, tag-based message to include a transfer context. The transfer context includes a reference to a first buffer for storing a piece of information without having to embed the piece of information in the customizable, tag-based message. The method further comprises sending the customizable, tag-based message to the network.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a structured diagram illustrating an exemplary SOAP message that contains a reference to a piece of information without the need for embedding the piece of information in the SOAP message;

DETAILED DESCRIPTION OF THE PREFERRED EMBODIMENT

Figure 1:
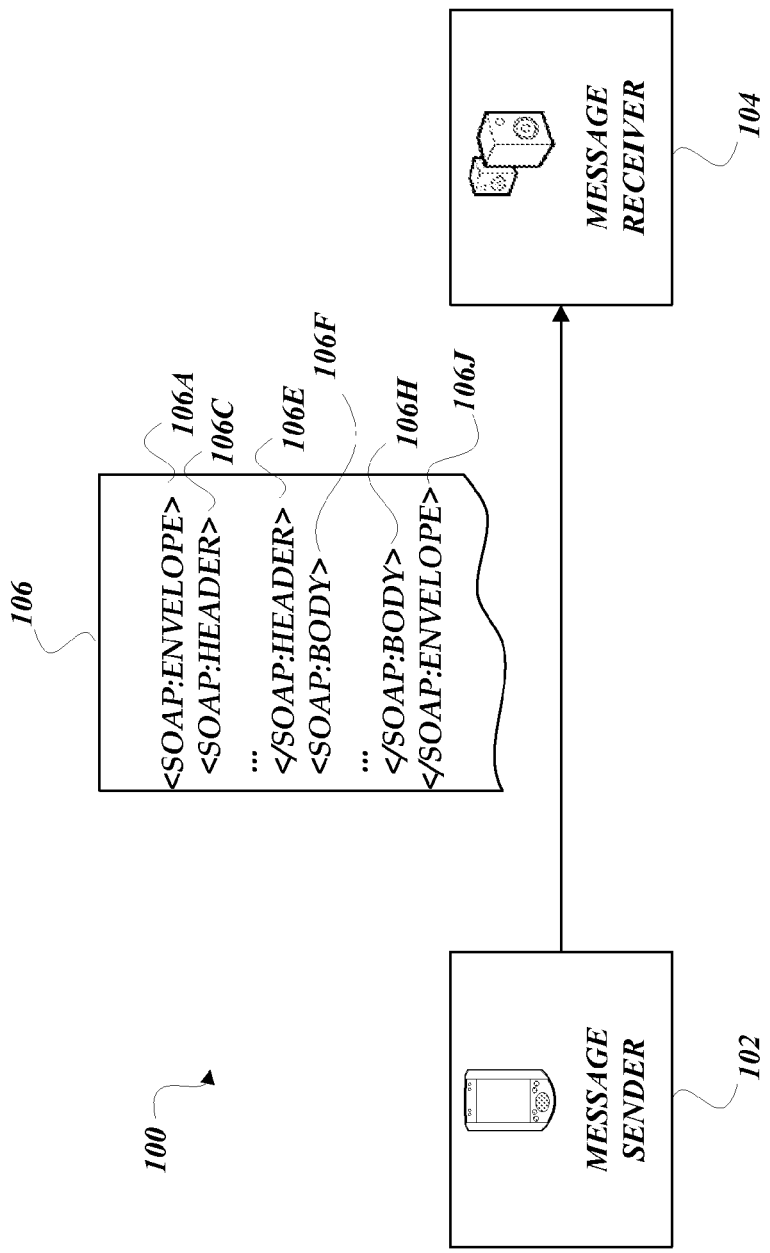
FIG. 1 is a block diagram illustrating a conventional system that embeds data in a SOAP message for transferring between a message sender and a message receiver.

In various embodiments of the present invention, a customizable, tag-based message is a unit of information transmitted electronically from one device to another that may contain one or more references to one or more pieces of information without the need for these pieces of information to be embedded in the customizable, tag-based message. The customizable, tag-based message can comply with any suitable protocol. One suitable protocol includes a customizable, tag-based protocol, such as SOAP, but other protocols can be used. An exemplary customizable, tag-based message can contain one or more blocks of text divided into a header and a body. The header preferably includes a reference to a piece of information if the piece of information is of a size too undesirably large for embedding in the customizable, tag-based language. The reference can be created from any suitable forms. One suitable form includes a Uniform Resource Identifier (URI), but others can be used. The reference in the header may be associated with a name whose scope is limited to the customizable, tag-based language. In generally, the header contains hints about how to resolve the URI (and as a result, how to find the buffer identified by the URI). The body of the customizable, tag-based language may use this name instead of the URI to refer to the piece of information. The name acts as an indirection to the piece of information allowing the body to be secured to prevent unauthorized access. The name also allows the URI to be changed in the header while its relationship to the piece of information remains intact (e.g., the URI may be changed by an intermediary, such as a firewall). In various embodiments that do not use the name, the hints may be changed by the intermediary while the relationship of the URI to the piece of information remains unchanged. The customizable, tag-based message can be routed directly from sender to receiver through a physical link, or it can be passed, either whole or in parts, through one or more intermediaries that route it from one system to another until the customizable, tag-based message reaches its destination.

Such a message is illustrated by a customizable, tag-based message 206 in a system 200. See FIG. 2A. The system 200 comprises a message sender 202 and a message receiver 204. The message sender 202 and the message receiver 204 can be formed from any suitable computing devices. Suitable computing devices for the message sender 202 include those computing devices that generate or facilitate the sending of pieces of information, such as multimedia information. One suitable message sender 202 includes a camcorder, which is a small portable that combines a video camera and a videocassette recorder. Suitable computing devices for the message receiver 204 include those computing devices that can receive, process, present, or display pieces of information, such as multimedia information. One suitable message receiver 204 includes a tablet PC, which is a touch-sensitive computer screen tablet for the entry of handwritten text using a stylus or digital pen and can function as a primary personal computer as well as a note-taking device. The system 200 enables an enhanced transmission of customizable, tag-based messages, such as the customizable, tag-based message 206, in the presence of a transmission failure because a number of retries are possible to re-transmit from a point of failure.

The customizable, tag-based message 206 includes a root tag 206A <SOAP:ENVELOPE> and its companion ending tag 206P </SOAP:ENVELOPE>. Contained between tags 206A, 206P is a header element defined between a tag 206C <SOAP:HEADER> and its companion ending tag 206E </SOAP:HEADER>. The header element is designed to contain control information sent from the message sender 202 to the message receiver 204. The header element is illustrated to contain an ellipsis (" . . . ") signifying that its contents need not be discussed here. Various embodiments of the present invention do not require the presence of the header element in the customizable, tag-based message 206. A pair of tags 206G <SOAP:BODY> and 206O </SOAP:BODY> define the body element of the customizable, tag-based message 206. Contained between tags 206G, 206O is a multimedia element defined between a tag 206I <M:MULTIMEDIA> and its companion ending tag </M:MULTIMEDIA> 206M. Tag 206I includes an attribute XMLNS:M for defining the name space of the multimedia element. The attribute XMLNS:M is defined at an address "HTTP://E.ORG/MULTIMEDIA." Contained between tags 206I, 206M is a video element, which is defined at line 206K by a tag <M:VIDEO> and its companion ending tag </M:VIDEO>. The video element, instead of containing video information, contains a reference (to a piece of video information) whose value is "ID:09233523." The value of the reference is a URI 202B that identifies a buffer 202A, which can either contain a piece of information to be sent or act as a repository for receiving a piece of information. In the example, above, the URI 202B identifies the buffer 202A, which contains video information to be sent to the message receiver 204 from the message sender 202. The message receiver 204 includes a buffer 204A identifiable at a URI 204B for sending or receiving a piece of information.

Figure 2A:
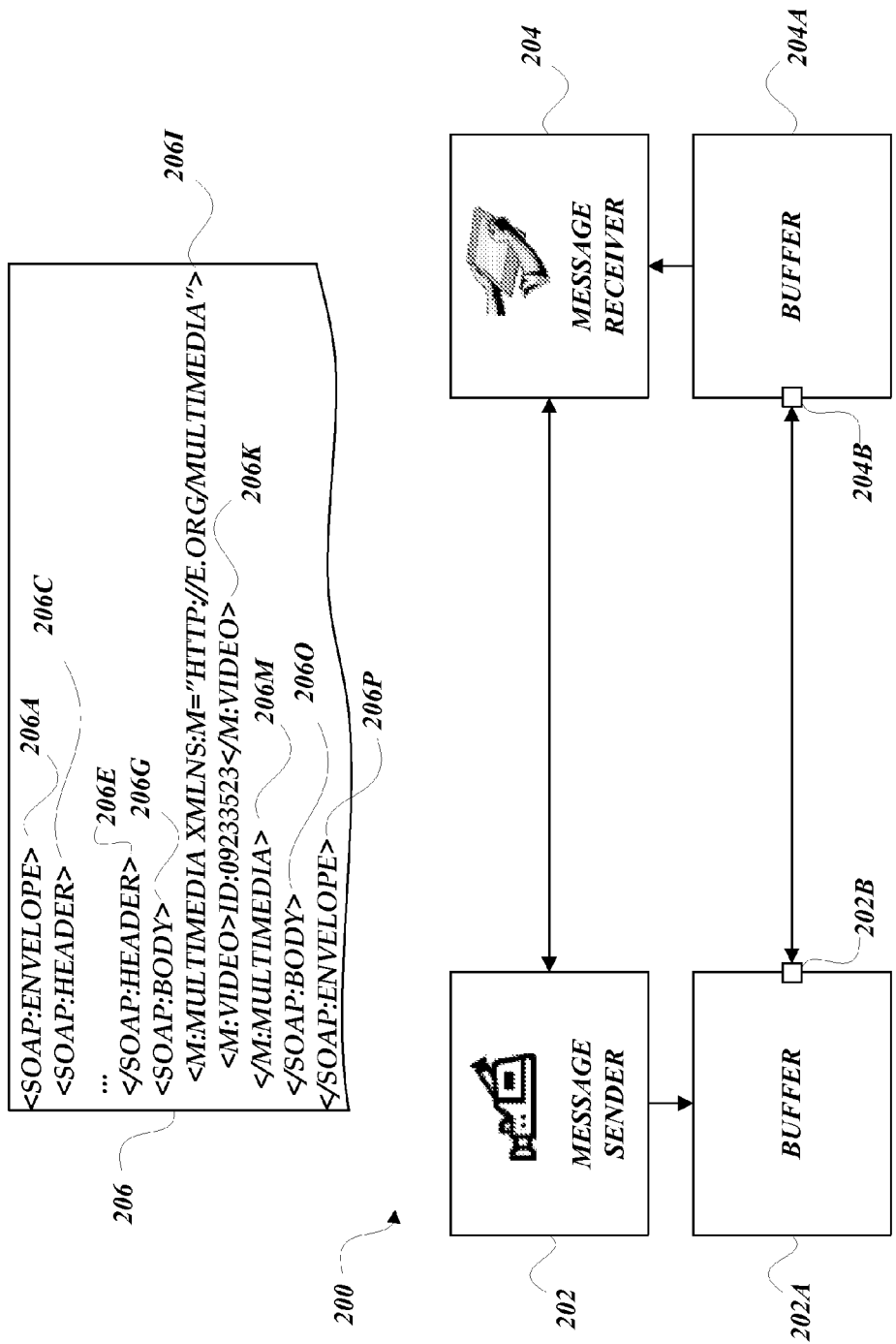
FIG. 2A is a block diagram illustrating an exemplary system for sending information by reference without embedding information in a SOAP message between a message sender and a message receiver.
Figure 2B:
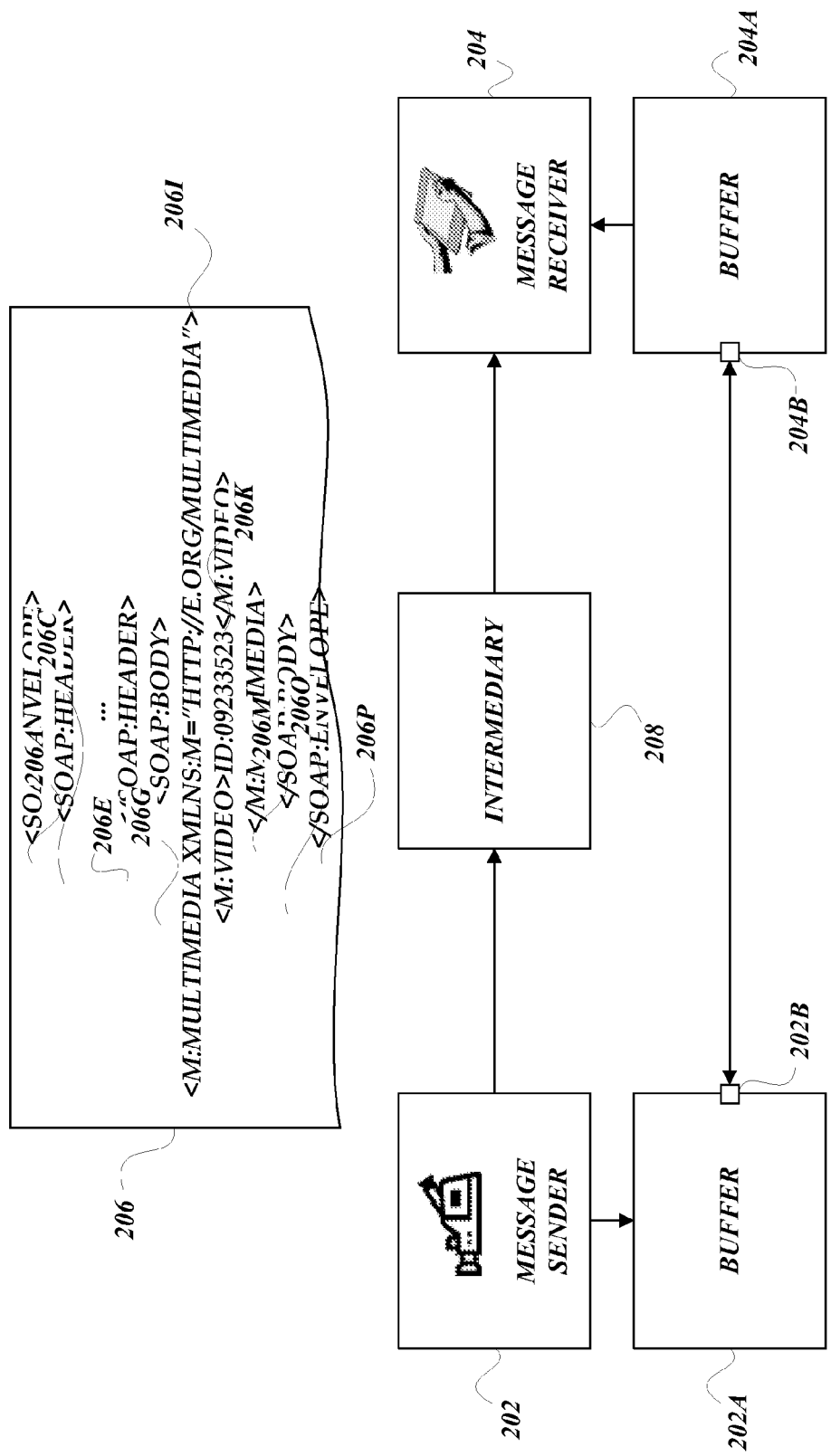
FIG. 2B is a block diagram illustrating another exemplary system for sending information by reference without embedding information in a SOAP message between a message sender, a message receiver, and an intermediary.

Various elements illustrated in FIG. 2A are repeated in FIG. 2B, and thus, the description of these elements is not repeated here for brevity purposes. FIG. 2B additionally illustrates an intermediary 208. The intermediary 208 interposes itself between the message sender 202 and the message receiver 204 and is capable of intercepting the customizable, tag-based message 206. The intermediary 208 acts as both a customizable, tag-based message sender and a customizable, tag-based receiver at the same time. If the intermediary 208 does not require the piece of information in the buffer 202A in transit to the buffer 204A to be intercepted by the intermediary 208, the message receiver 204 can communicate directly to the buffer 202B via the URI 202B to read the piece of information in the buffer 202A.

The customizable, tag-based message 206 as illustrated in FIGS. 2A, 2B places the reference to the piece of information in the body element of the customizable, tag-based message 206, in accordance with one embodiment. In this embodiment, the header needs not be used. This embodiment is particularly useful when the body element of the customizable, tag-based message 206 is not secured by encryption or other means. This embodiment can also be used in cases where the message receiver 204 can communicate directly with the message sender 202 to read from or write a piece of information to the buffer 202A without going through the intermediary 208.

Figure 2C:
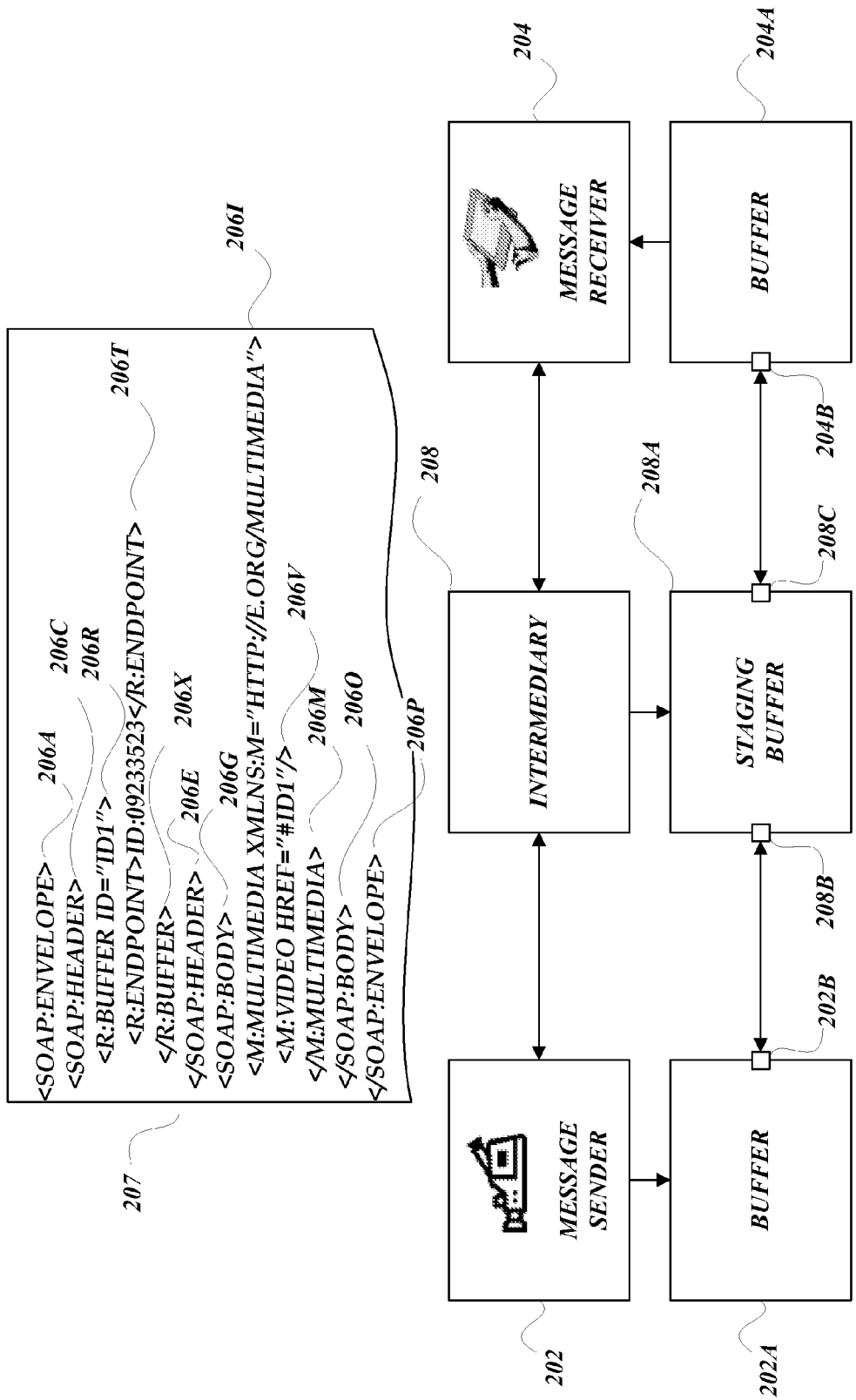
FIG. 2C is a block diagram illustrating yet another exemplary system for sending information by reference without embedding information in a SOAP message among a message sender, a message receiver, and an intermediary.

Various elements illustrated in FIGS. 2A, 2B are repeated in FIG. 2C, and thus, the description of these elements is not repeated here for brevity purposes. FIG. 2C additionally illustrates a customizable, tag-based message 207 and a staging buffer 208A for the intermediary 208. FIG. 2C shows an embodiment where the intermediary 208 requires interception of customizable, tag-based messages, such as the customizable, tag-based message 207, and pieces of information referenced by the customizable, tag-based message 207.

Regarding the customizable, tag-based message, contained between tags 206C, 206E is a buffer element defined by a beginning tag 206R <R:BUFFER> and its companion ending tag 206X </R:BUFFER>. The tag 206R includes an attribute ID that is defined to contain "ID1". The attribute ID is a name of local scope to the customizable, tag-based message 207, which is used subsequently in the body element (defined by tags 206G, 206O) of the customizable, tag-based message 207. Line 206T defines a reference to the buffer 202A, which is the URI 202B of the buffer 202A. Line 206T contains an end point element defined by a beginning tag <R:ENDPOINT> and its companion ending tag </R:ENDPOINT> and the content between these tags is ID:09233523 defining the URI 202B. The buffer element creates an association between the attribute ID and the URI 202B of the buffer 202A through the endpoint element.

Line 206V defines the video element (instead of embedding the piece of information stored in the buffer 202A) to include by reference the attribute ID previously declared in the header element. The attribute ID creates a relationship in the body element of the customizable, tag-based message 207 to the piece of information stored in the buffer 202A even if the URI associated with the attribute ID as declared in the header is changed by the intermediary 208. The video element at line 206V defines a tag <M:VIDEO> along with an attribute HREF. The HREF attribute is defined to contain "#ID", where the # is a delimiter indicating that the name ID1 is defined in the header with an associated URI defined at line 206T.

As previously described, the body of the customizable, tag-based message 207, defined between tags 206G, 206O can be secured to prevent unauthorized access. The intermediary 208 need not process the body of the customizable, tag-based message 207. The intermediary 208 can use the information in the header element of the customizable, tag-based message 207 to create a staging buffer 208A so as to accommodate situations where the piece of information in the buffer 202A cannot be transferred directly to the buffer 204A. On such situation includes an instance where the intermediary acts as a firewall between the message sender 202 and the message receiver 204.

The staging buffer 208A preferably has a URI 208B where the buffer 202A can communicate and transfer the piece of information to it. The intermediary 208 then allows the staging buffer 208A to transfer information to the buffer 204A. The message receiver 204 can query the staging buffer 208A for meta data information by using the URI 208C of the staging buffer 208A. One example of an intermediary 208 that works in this way is a firewall as noted above. A firewall is a security system intended to protect an organization's network against unsecured access coming from another network, such as the Internet. A firewall prevents computers, such as the message sender 202 in the organization's network, from communicating directly with computers, such as the message receiver 204, external to the network, and vice versa. All communication is routed through the intermediary 208 at the boundary of the organization's network, and the intermediary 208, which acts as the firewall, decides whether it is safe to let a particular message, such as the piece of information stored in the buffer 202A, pass through the boundary.

FIG. 3 illustrates a structure diagram of an exemplary customizable, tag-based message 300 which can be passed from a message sender 202 to a message receiver 204 that may be intercepted by one or more intermediaries 208. The customizable, tag-based message 300 includes an envelope element defined between a root tag 302 <SOAP:ENVELOPE> and its companion ending tag 338 </SOAP:ENVELOPE>. The tag 302 includes an attribute XMLNS:S that defines a namespace for a SOAP message. The attribute XMLNS:S is equated to an address "HTTP://WWW.W3.ORG/2003/05/SOAP-ENVELOPE."

Contained between tags 302, 338 is a header element defined between a beginning tag 304 <SOAP:HEADER> and its companion ending tag 326 </SOAP:HEADER>. Contained between tags 304, 326 is an RDMA element defined between a beginning tag 306 <R:RDMA> and its companion ending tag 324 </R:RDMA>, which contains control information pertaining to a remote direct memory access (RDMA) transfer session. The tag 306 includes an attribute XMLNS:R for defining a namespace for the RDMA element. The namespace XMLNS:R is equated to an address "HTTP://MAGNET/CONTRACT/2003/08/RDMA.XSD." Contained between tags 306, 324 is a session service element defined between a beginning tag 308 <R:SERVICEINFO> and its companion ending tag 322 </R:SERVICEINFO>, which contains control information pertaining to a session service 402F representing a buffer 402B1 at a node 402 (FIG. 4B). The tag 308 includes an attribute SERVICE, which is equated to the URI 402F1 of the session service 402F, which in this case is defined to be "RDMAP:09233523-345B-4351-B623-5DSF35SGS5D6." Contained between tags 308, 322 is tag 310 <R:HOST> for defining a server computer or the node 402 that has access to other computers on the network. In this instance, the tag 310 is defined to be "EXAMPLE.COM." Between tags 308, 322 is tag 312 <R:PROTOCOL> for defining a protocol, which is a set of rules or standards designed to enable computers to connect with one another and to exchange information with as little error as possible. In this instance, the tag 312 is defined to be the numeral 6. Contained between tags 308, 322 is tag 314 <R:PORT> for defining a port on the host defined by tag 310 such that network communication can occur. In this instance, the tag 314 is defined to be the numeral 808. Contained between tags 308, 322 is tag 316 <R:CONTRACT> for defining a contract that describes one or more behaviors of the session service 402F representing the buffer 402B1. One suitable implementation of the contract is as described in the U.S. patent application titled "Decentralized, Distributed Operating System," filed concurrently herewith. The tag 316 includes an address where the contract for the service representing the buffer 202A may be found "HTTP://EXAMPLE.ORG/RDMA/READ." Contained between tags 308, 322 is tag 318 <R:TAG> for defining a steering tag, which is usable by an RNIC (network interface that is capable of understanding remote direct memory access operations including a network interface card and other supporting infrastructure). The tag 318, in this instance, contains the numerical sequence 983452346, which is the identifier for the steering tag that is associated with the physical address of the buffer 402B1. Contained between tags 308, 322 is a tag 320 <R:LENGTH> for defining the length of the buffer 202A. In this instance, the tag 320 defines the length of the buffer 402B1, which is 231245646. Tags 310-320 are hints optionally placed in the header element to enhance network performance so that other nodes need not communicate with the originator of the customizable, tag-based message 300 to obtain one or more of the hints described by tags 310-320.

The customizable, tag-based message 300 includes a body element defined between a beginning tag 328 <SOAP:BODY> and its companion ending tag 336 </SOAP:BODY>. Because of the use of references in various embodiments of the present invention, the body of the Customizable, tag-based message 300 need not embed the actual piece of information but can use one or more references to refer to the piece of information stored outside of the customizable, tag-based message 300. Contained between tags 328, 336 is a multimedia element defined between a beginning tag 330 <M:MULTIMEDIA> and its companion ending tag 334 </M:MULTIMEDIA>. Contained between tags 330, 334 is a video element defined by a tag 332 <M:VIDEO> and its companion ending tag </M:VIDEO> that contains a reference, which in this case is "RDMAP:09233523-345B-4351-B623-5DSF35SGS5D6."

A networked system 400 comprises the node 402, which includes a message sender such as the message sender 202, and a node 404, which includes a message receiver, such as the message receiver 204. See FIG. 4A. Nodes 402, 404, include central processing units 402A, 404A. Central processing units 402A, 404A are each the computational and control unit of a computing device. The central processing unit 402A, 404A is the device that interprets and executes instructions. The central processing unit 402A, 404A has the ability to fetch, decode, and execute instructions and to transfer information to and from other resources over the computer's main data-transfer path or bus. In various embodiments of the present invention, the term central processing unit encompasses the processor of nodes 402, 404.

Nodes 402, 404 include pieces of memory 402B, 404B. Pieces of memory 402B, 404B include devices where information can be stored and retrieved. Pieces of memory 402B, 404B can refer to external storage such as disk drives or tape drives, but can also refer to the computer's main memory, which is the fast semiconductor storage (RAM) directly connected to the central processing unit 402A, 404A. Pieces of memory 402B, 404B include buffers 402B1, 404B1, which are each a region of memory reserved for use as an intermediate repository in which information is temporarily held while waiting to be transferred between two locations or devices.

Nodes 402, 404 include RNICs 402C, 404C. RNICs 402C, 404C mediate between the nodes 402, 404 and physical media, such as cabling, over which network transmissions travel. RNICs 402C, 404C associate a buffer address 402C1, 404C1 with steering tags (shown in FIGS. 4A, 4B as S-TAG) 402C2, 404C2. Buffer addresses 402C1, 404C1 refer to the addresses of buffers 402B1, 404B1. The steering tags 402C2, 404C2 are used by the RNICs 402C, 404C to transfer information in buffers 402B1, 404B1 without the need for the central processing units 402A, 404A to execute copy instructions.

RNICs 402C, 404C are coupled together by a network 406. The network 406 is a group of computers and associated devices that are connected by communication facilities. The network 406 can involve permanent connections, such as cables, or temporary connections made through telephone or other communication links. The network 406 can be as small as a LAN (local area network) consisting of a few computers, printers, and other devices, or it can consist of many small and large computers distributed over a vast geographic area (WAN or wide area network). Various embodiments of the present invention allow a Customizable, tag-based message 300 to contain control information communicated between nodes 402, 404 without the need to include bulky pieces of data along with the Customizable, tag-based message 300.

Various embodiments of the present invention use one or more references in the customizable, tag-based message 300 to refer to one or more pieces of information stored in buffers 402B1, 404B1 without having to include the pieces of information stored in buffers 402B1, 404B1 in the body element of the customizable, tag-based message 300. When the customizable, tag-based message 300 has been received by an appropriate node 402, 404, the reference is resolved and RNICs 402C, 404C communicate with one another to allow the transfer of the piece of information without requiring the central processing units 402A, 404A to execute copy instructions.

Figure 4A:
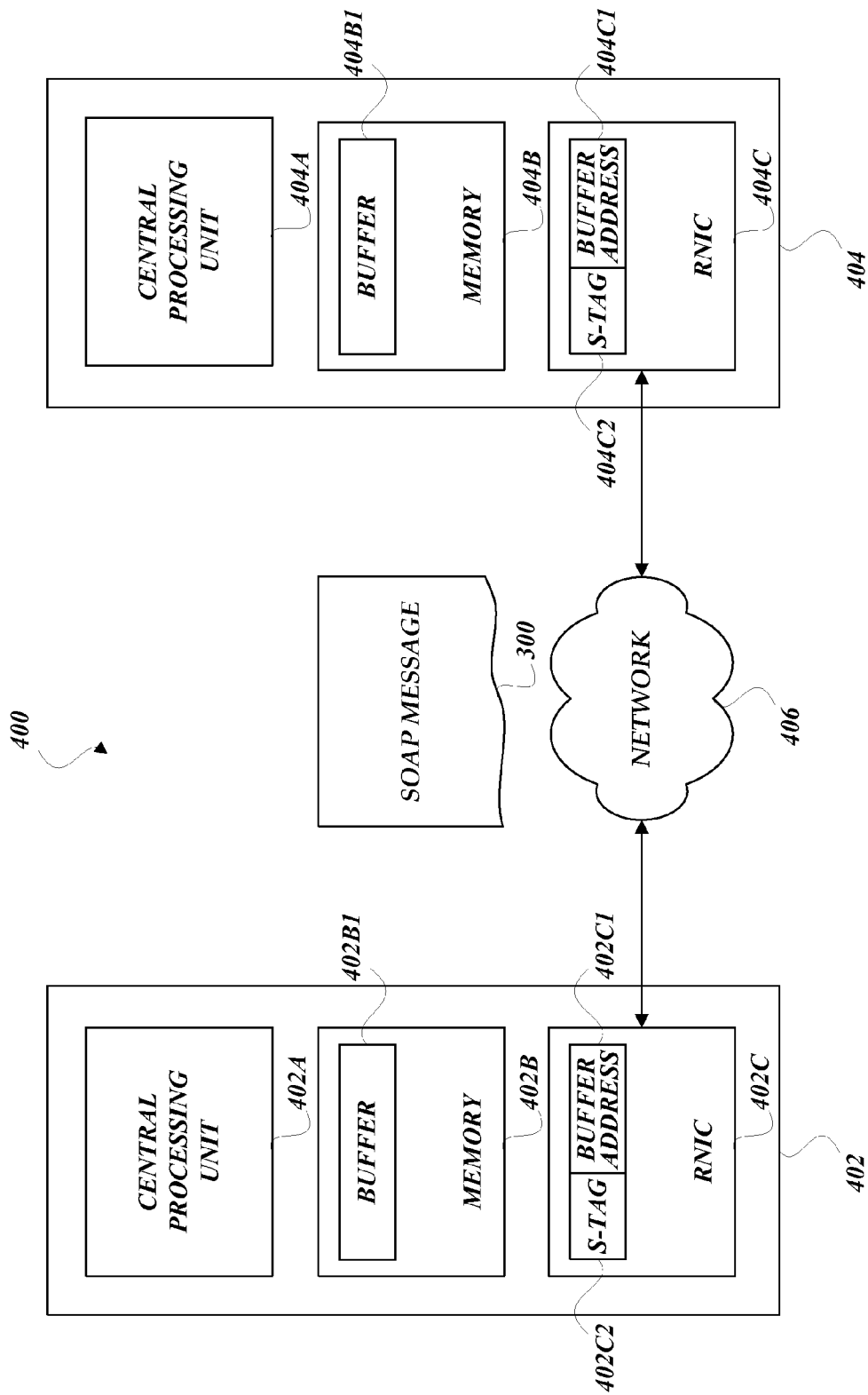
FIG. 4A is a block diagram illustrating an exemplary networked system for sending pieces of information by reference in a SOAP message.
Figure 4B:
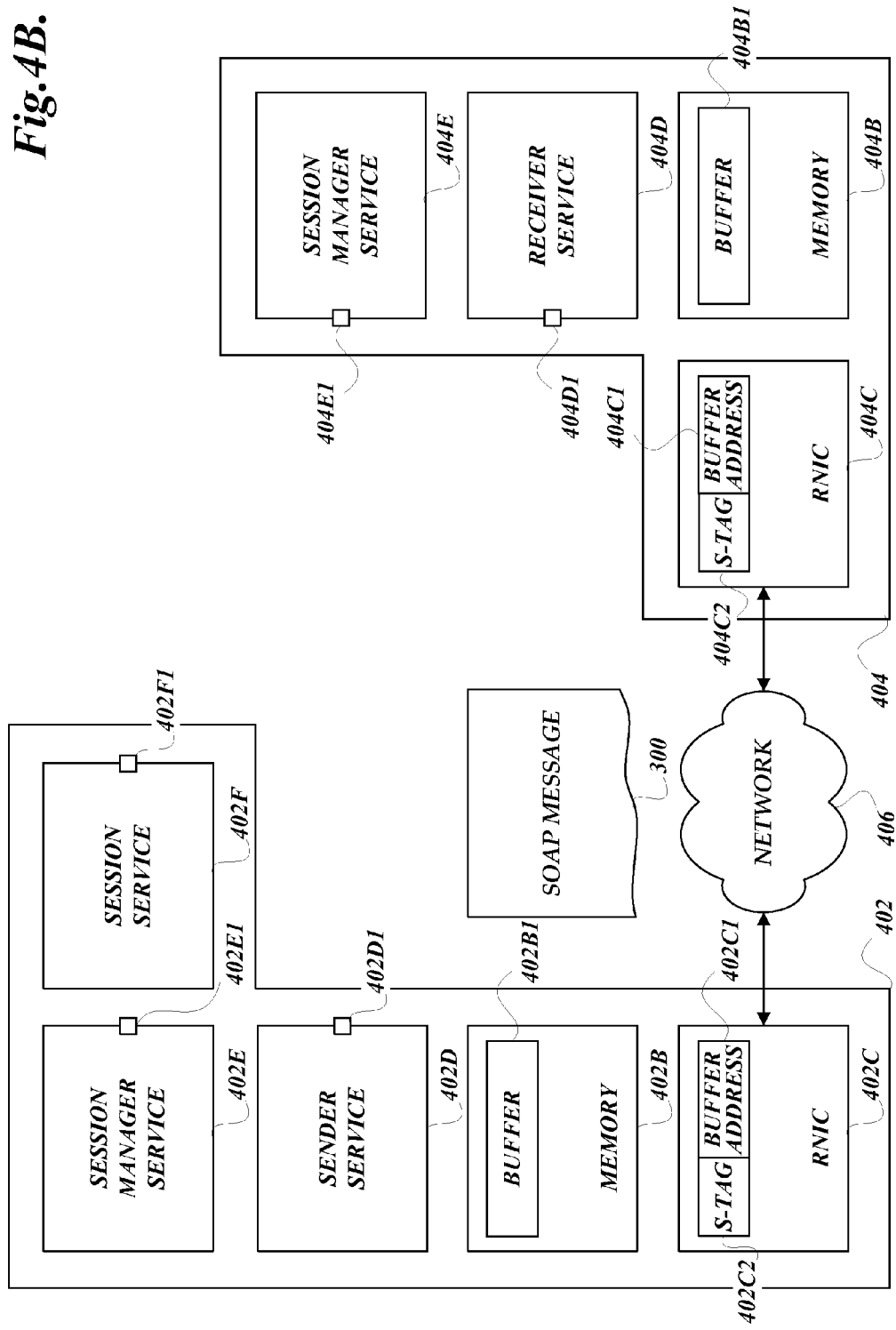
FIG. 4B is a block diagram illustrating another exemplary networked system for sending pieces of information by reference in a SOAP message.
Figure 5A:
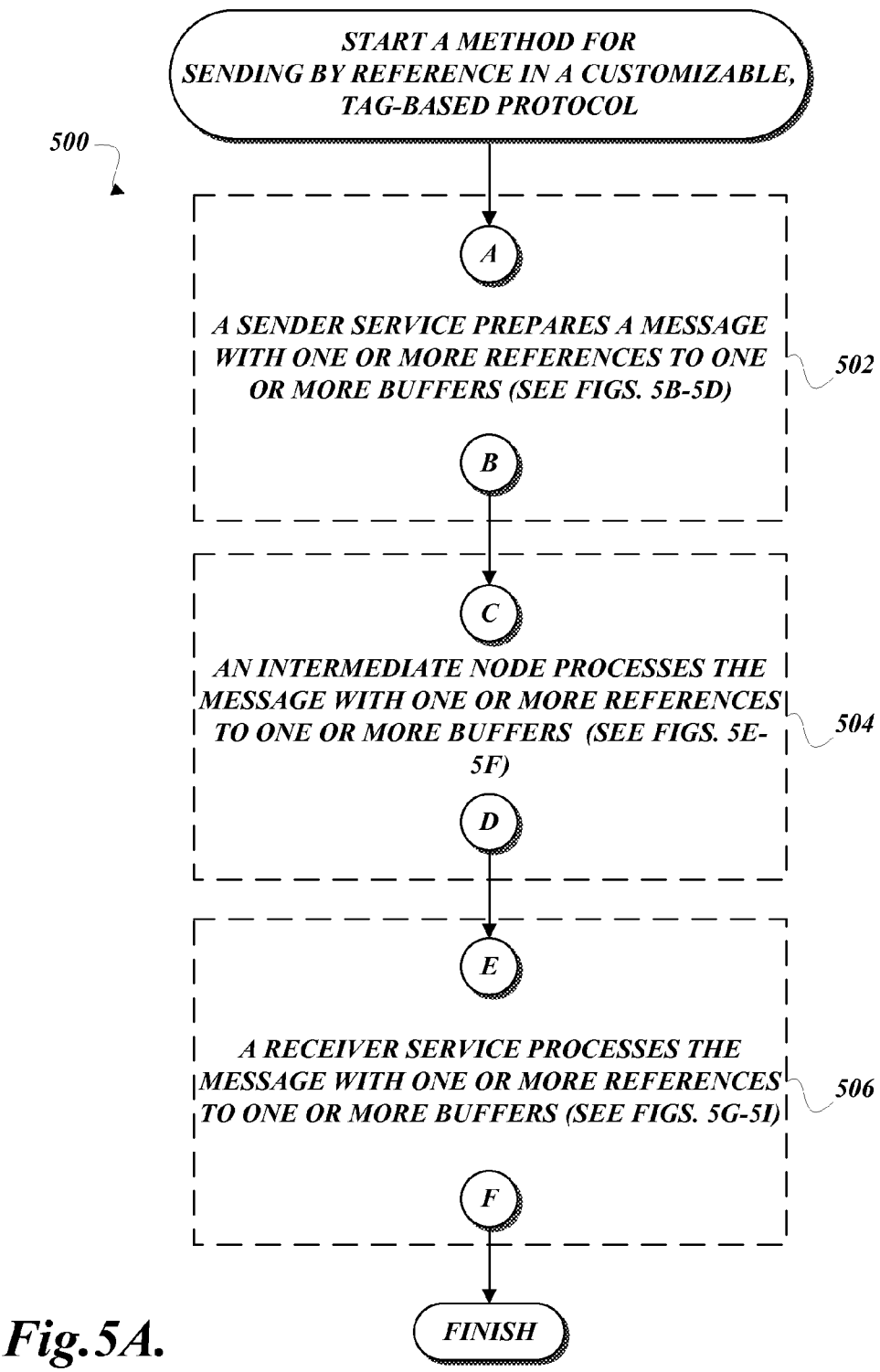
FIGS. 5A-5I are process diagrams illustrating a method for sending information by reference in a customizable, tag-based protocol, according to one embodiment of the present invention.
Figure 5B:
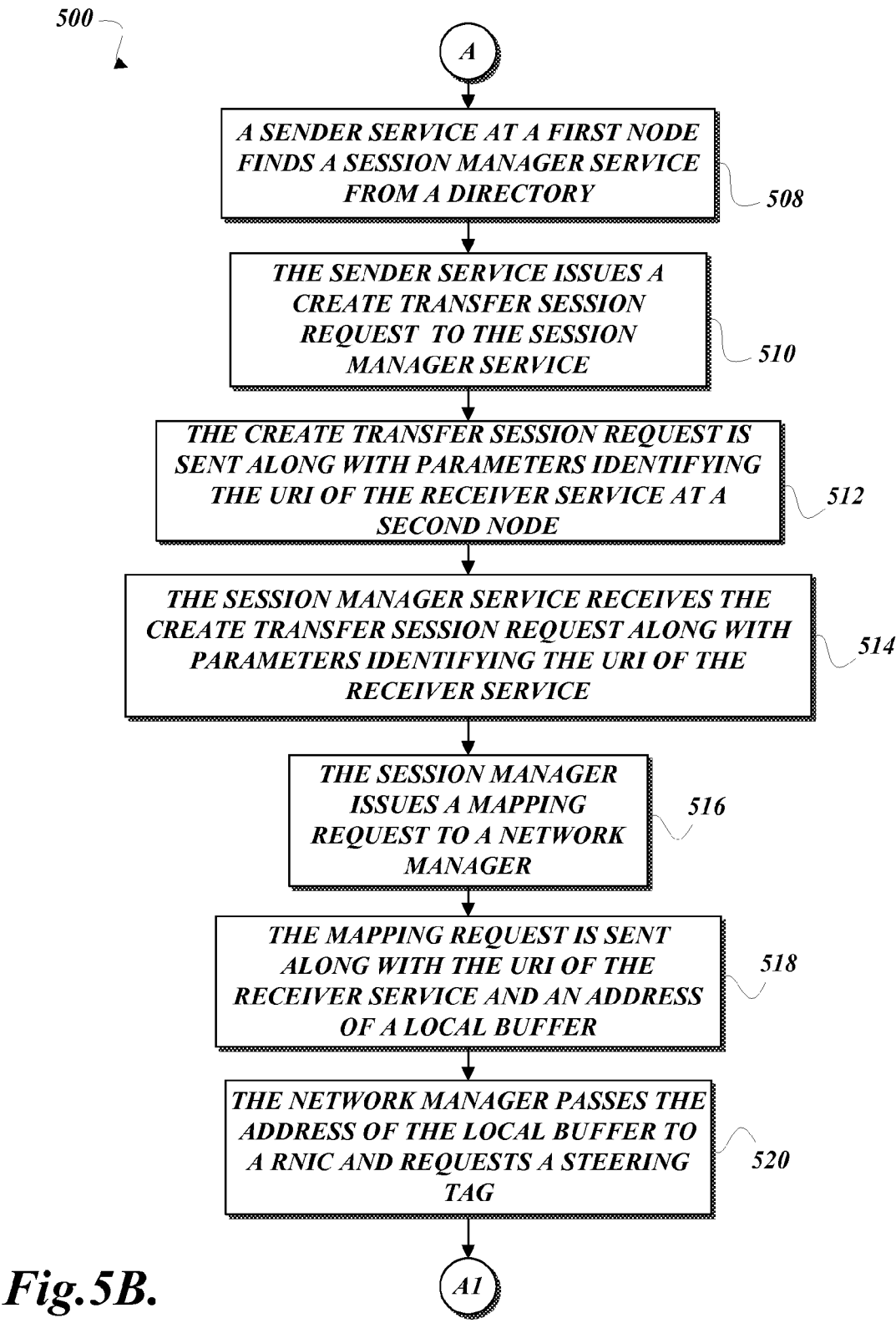
Figure 5C:
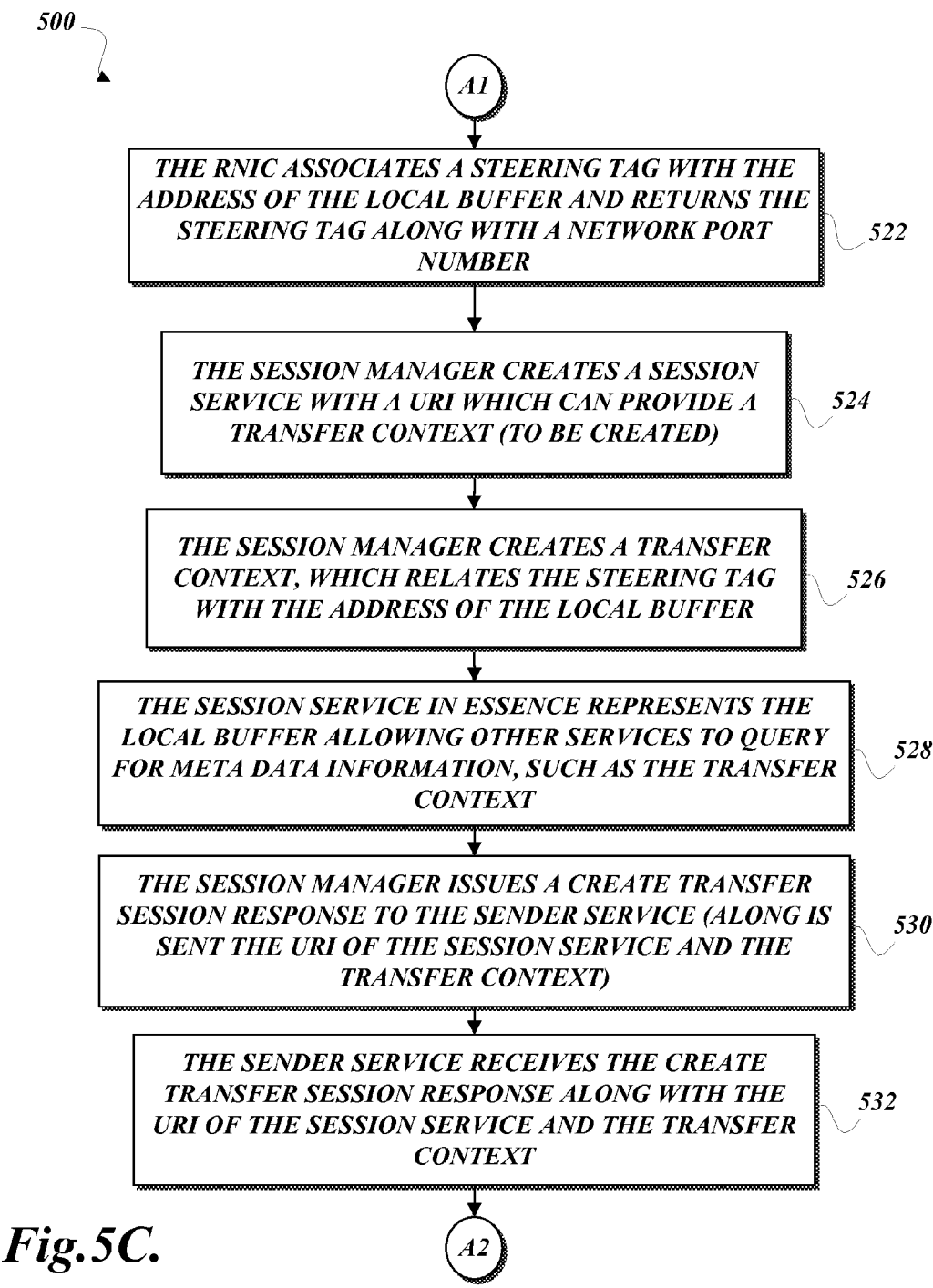
Figure 5D:
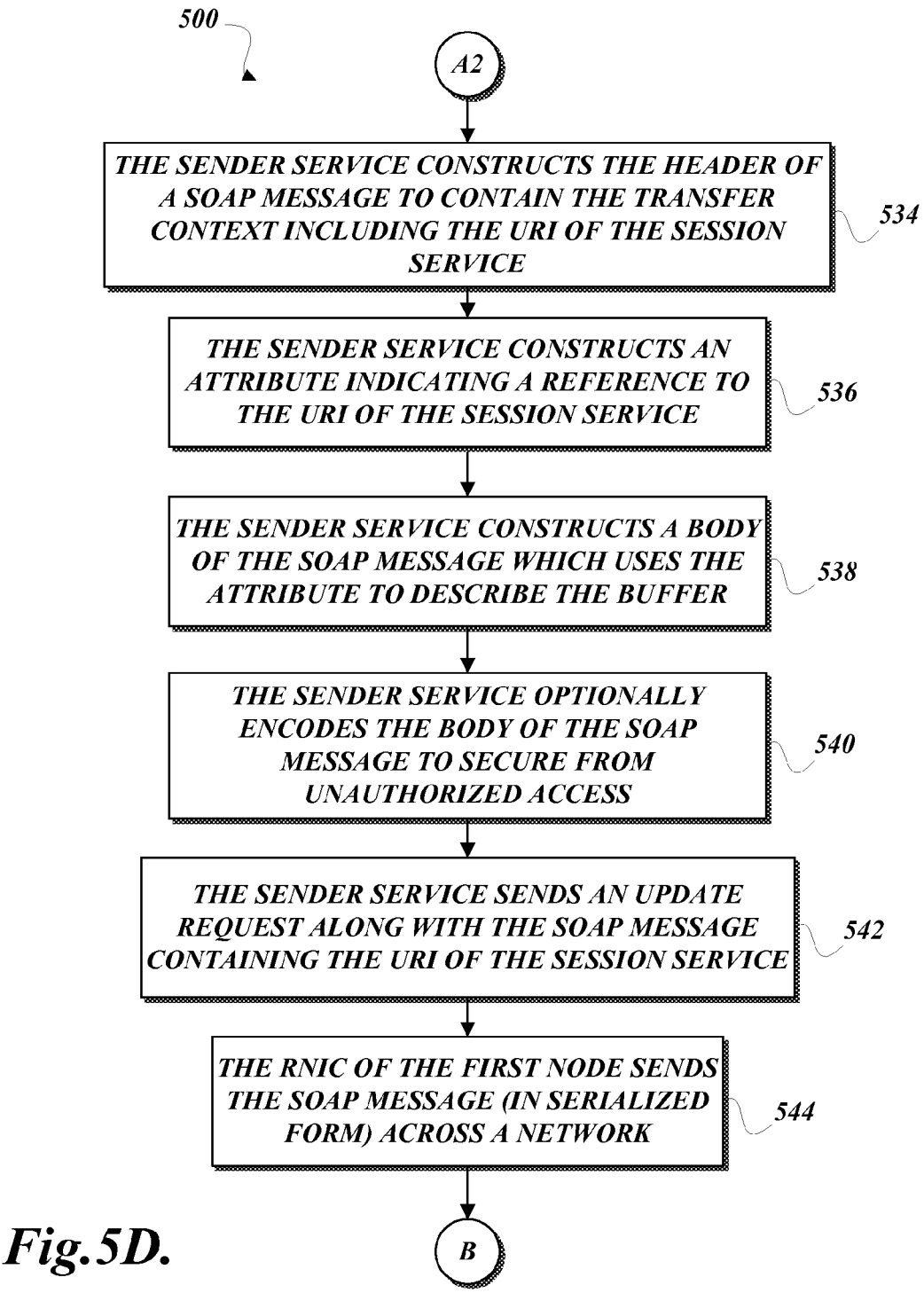
Figure 5E:
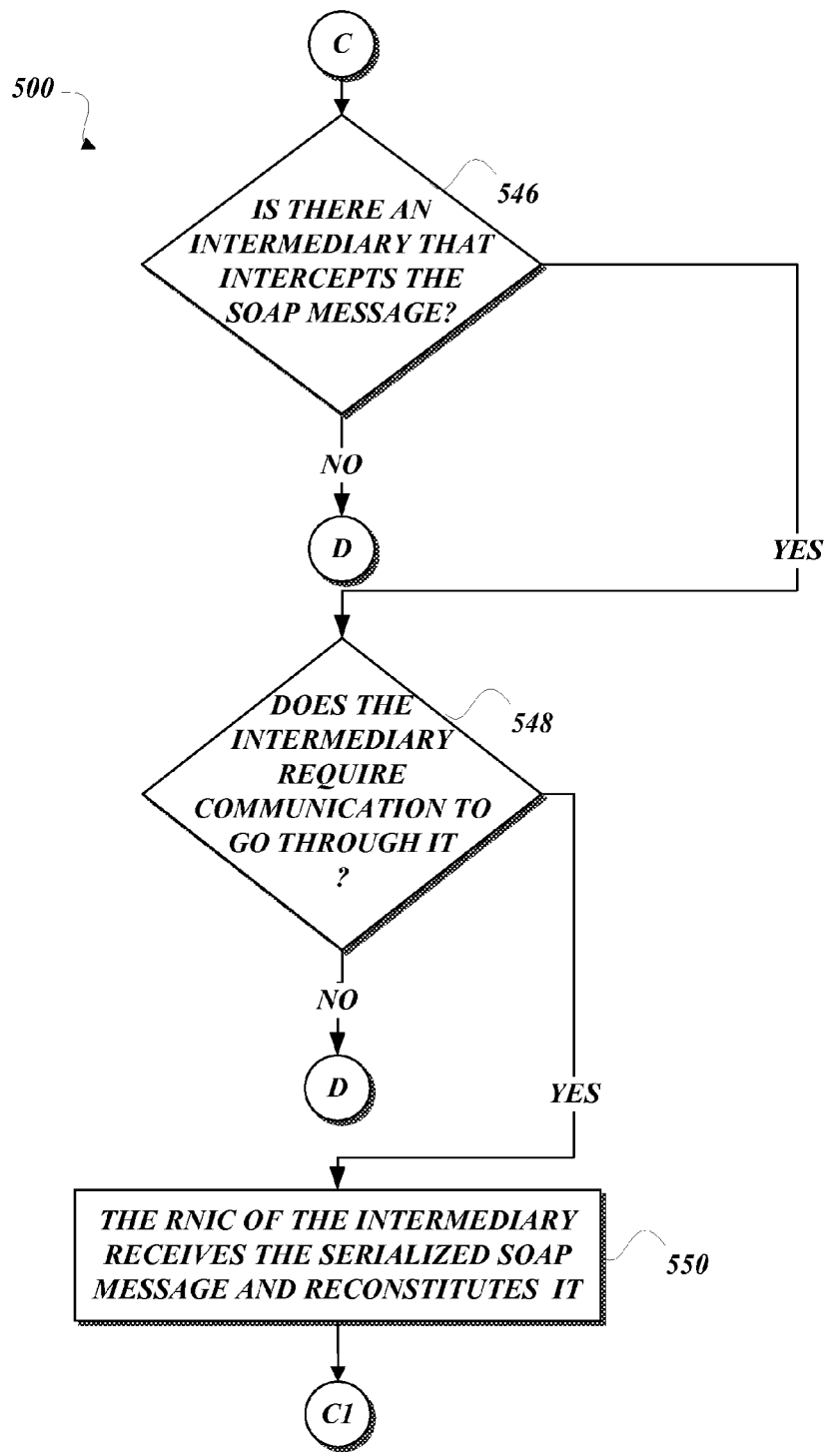
Figure 5F:
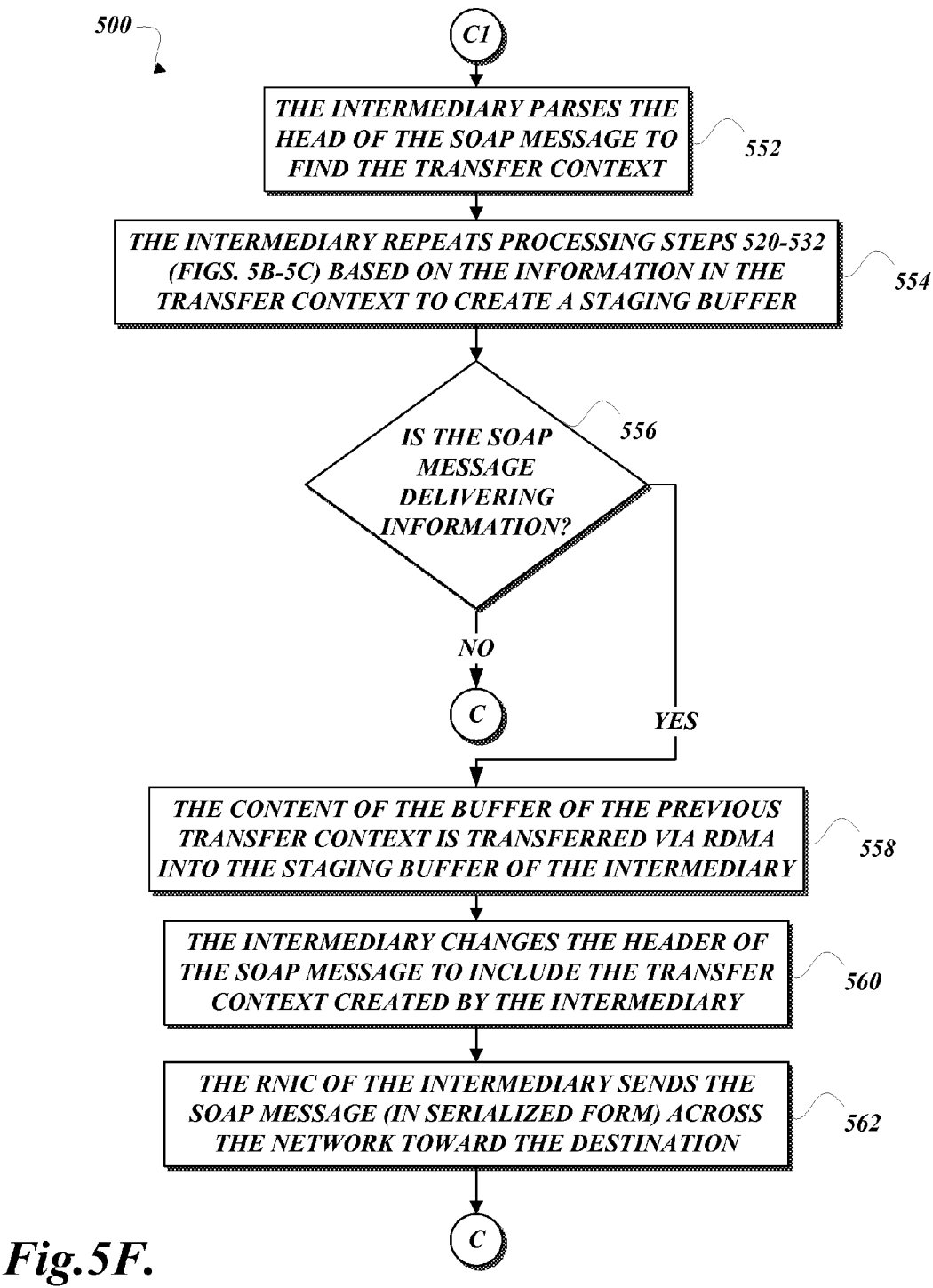
Figure 5G:
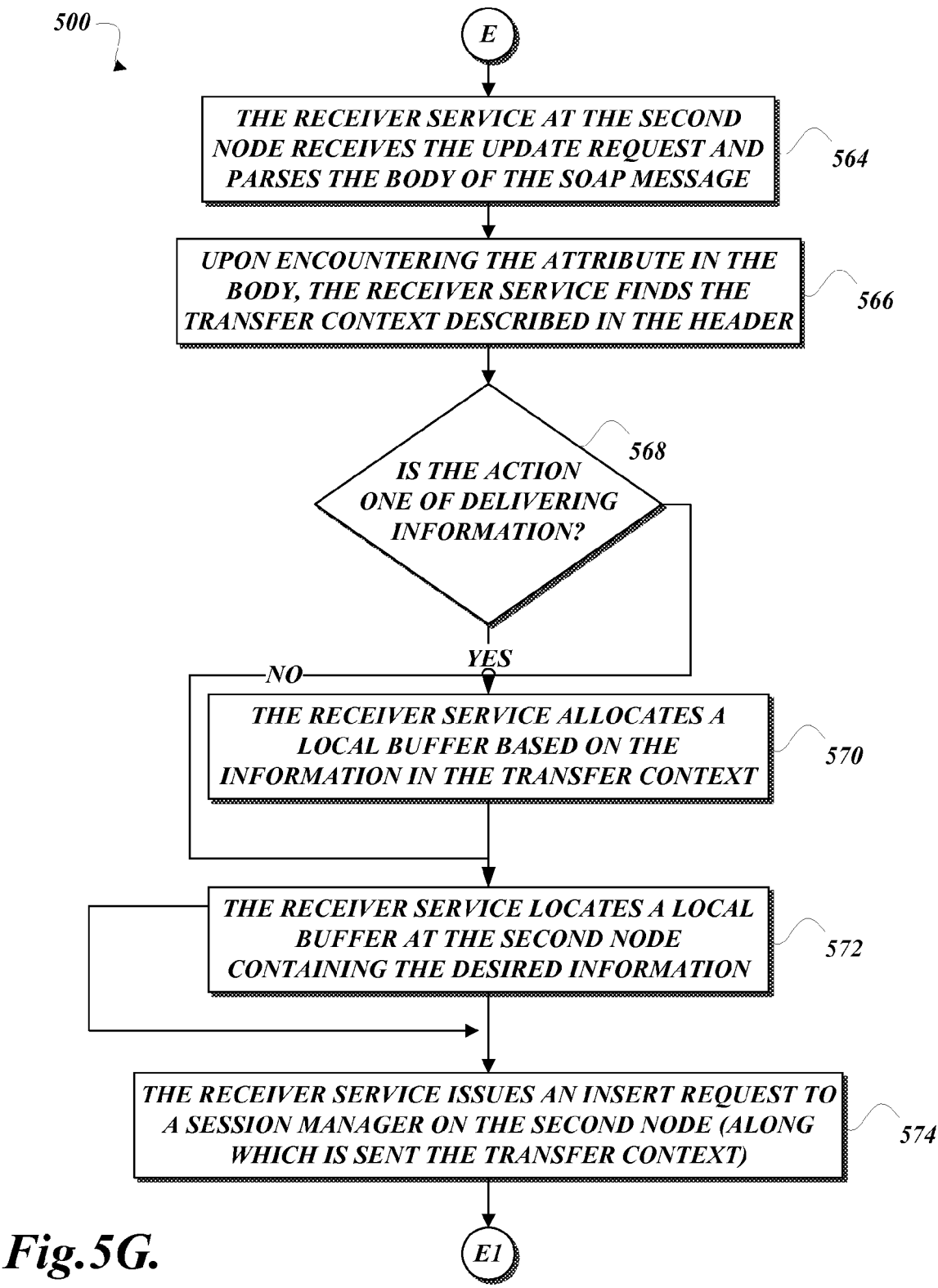
Figure 5H:
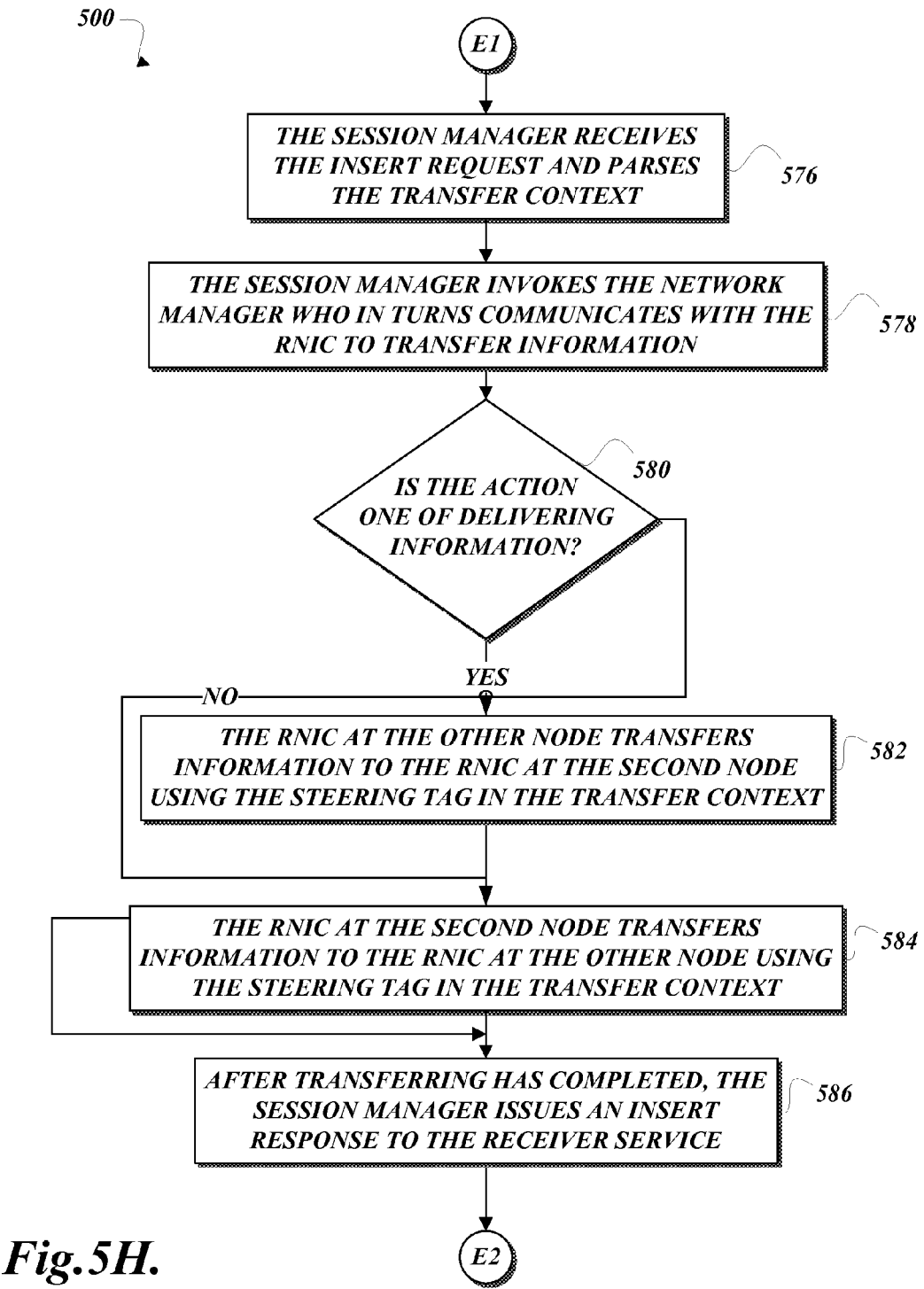
Figure 5I:
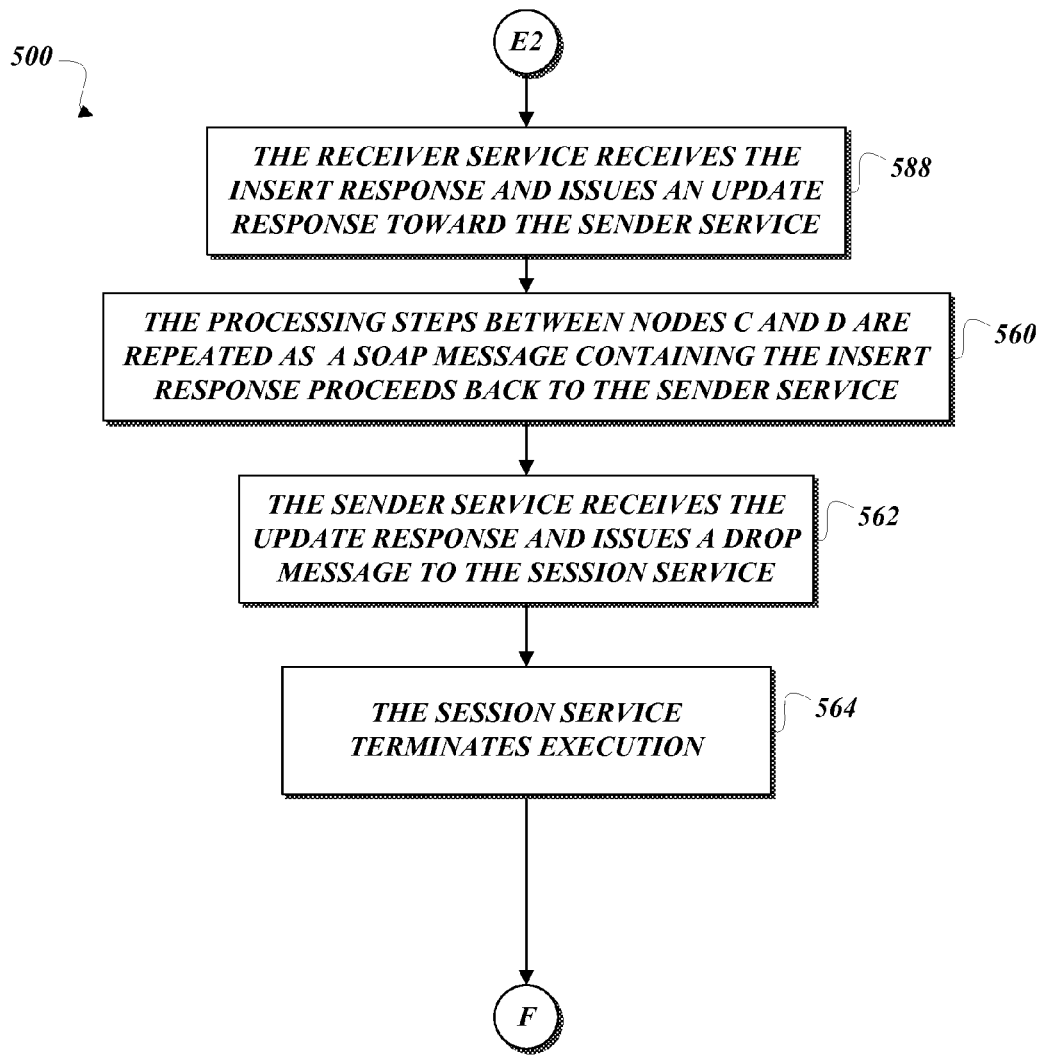

Various elements illustrated in FIG. 4A are repeated in FIG. 4B, and thus, the description of these elements is not repeated here for brevity purposes. FIG. 4B illustrates another networked system. The node 402 includes a sender service 402D identifiable at URI 402D1. One suitable implementation of a service is as described in the previous cited U.S. patent application, which is titled "Decentralized, Distributed Operating System," and filed concurrently herewith. The sender service 402D represents a message sender, such as the message sender 202.

The sender service 402D is the originator of the customizable, tag-based message 300, which contains control information and a reference to the piece of information stored in the buffer 402B1. The node 402 includes a session manager service 402E identifiable at URI 402E1. The session manager service 402E is responsible for creating new transfer sessions between the node 402 and the node 404. Preferably, the session manager service 402E is located with the sender service 402D at node 402. The node 402 includes a session service 402F identifiable at URI 402F1. The session service 402F is created by the session manager service 402E to associate a steering tag 402C2 with the buffer address 402C1 at which resides the buffer 402B1. The session service 402F represents, in essence, the buffer 402B1. Various services external and internal to the node 402 can query the session service 402F to gain metadata information about the buffer 402B1, such as its length, its steering tag 402C2, and so on.

The node 404 includes a receiver service 404D identifiable at URI 404D1. The receiver service 404D represents a message receiver, such as the message receiver 204. When the receiver service 404D has received the customizable, tag-based message 300 sent by the sender service 402D, it parses the customizable, tag-based message 300. If the receiver service 404D encounters a reference to a piece of information in the body element of the customizable, tag-based message 300, the receiver service 404D preferably enlists the help of a session manager service 404E identifiable at URI 404E1. The session manager service 404E either communicates with the session service 402F at URI 402F1 to obtain the steering tag 402C2 or the steering tag 402C2 is already enclosed in the header of the customizable, tag-based message 300. Using the steering tag 402C2, the RNIC 404C communicates with the RNIC 402C to obtain the buffer address 402C1 of the buffer 402B1 and transfers information in the buffer 402B1 across the network 406 into the buffer 404B1 of memory 404B without the need to execute copy instructions by the central processing units 402A, 404A.

FIGS. 5A-5I illustrate a method 500 for sending by reference in a customizable, tag-based protocol. For clarity purposes, the following description of the method 500 makes references to various elements illustrated in connection with the message sender 202, the message receiver 204 (FIG. 2A), the intermediary 208 (FIG. 2C), the staging buffer 208A (FIG. 2C), the customizable, tag-based message 300 (FIG. 3), and various services 402D, 402E, 402F, 404D, and 404E (FIG. 4B). From a start block, the method 500 proceeds to a set of method steps 502, defined between a continuation terminal ("terminal A") and an exit terminal ("terminal B"). The set of method steps 502 describes the process by which a sender service prepares a customizable, tag-based message with one or more references to one or more buffers (see FIGS. 5B-5D).

From terminal A (FIG. 5B), the method 500 proceeds to block 508 where the sender service 402D, such as the message sender 202, at a first node, such as node 402, finds a session manager service, such as the session manager service 402E, from a directory. At block 510, the sender service 402D issues a create transfer session request to the session manager service 402E. The create transfer session request is sent along with parameters identifying the URI 404D1 of a receiver service 404D, such as the message receiver 204, at a second node, such as node 404. See block 512.

The method 500 proceeds to block 514 where the session manager service receives the create transfer session request along with the parameters identifying the URI of the receiver service, such as URI 404D1. At block 516, the session manager issues a mapping request to a network manager (not shown). The mapping request is sent along with the URI 404D1 of the receiver service 404D and an address 402C1 of a local buffer, such as buffer 402B1. See block 518. The method 500 proceeds to block 520 where the network manager passes the address of the local buffer (element 402C1) to an RNIC, such as RNIC 402C, and requests a steering tag, such as steering tag 402C2. The method 500 then enters another continuation terminal ("terminal A1").

From terminal A1 (FIG. 5C), the method 500 proceeds to block 522 where the RNIC 402C associates the steering tag 402C2 with the address of the local buffer 402C1 and returns the steering tag 402C2 along with a network port number. The network port number is an identifier of a port on the RNIC 402C where network communication occurs for a particular session. At block 524, the session manager 402E creates a session service 402F with the URI 402F1, which can provide a transfer context to other services that request such information. The session manager 402E then creates a transfer context, which relates the steering tag 402C2 with the address of the local buffer 402C1. See block 526. In one embodiment, the transfer context preferably contains pieces of information such as the host of the node 402; the protocol; the port created by the RNIC 402C; the contract associated with the session service 402F; the steering tag 402C2; and the length of the buffer 402B1. In another embodiment, the transfer context contains various pieces of information described in the previous sentence, and additionally, the URI 402F1 of the session service 402F. One exemplary implementation of the transfer context is shown at FIG. 3 by tags 308, 310, 312, 314, 316, 318 and 320.

The method 500 proceeds to block 528 where the session service, in essence, represents the local buffer 402B1 allowing other services to query for metadata information, such as the described transfer context. At block 530, the session manager 402E issues a create transfer session response to the sender service 402D. Along with the response is sent the URI 402F1 of the session service 402F and the transfer context. The sender service 402D1 receives the create transfer session response from the session manager service 402E along with the URI 402F1 of the session service 402F and the transfer context. See block 532. The method 500 continues to another continuation terminal ("terminal A2").

From terminal A2 (FIG. 5D), the method 500 proceeds to block 534 where the sender service 402D constructs the header element (such as the header element defined between tags 304, 326) of a customizable, tag-based message, such as the customizable, tag-based message 300, to contain the URI 402F1 of the session service 402F and preferably the transfer context. At block 536, the sender service 402D1 constructs an attribute (such as attribute ID defined at line 206R), indicating a reference to the URI 402F1 of the session service 402F. The sender service 402D1 constructs a body element (such as the body element defined between tags 328 and 336) of the customizable, tag-based message 300 which uses the attribute to describe the buffer 402B1. See block 538. The sender service 402D optionally encodes the body of the customizable, tag-based message 300 to secure it from unauthorized tampering, unauthorized access, or both. See block 540. At block 542, the sender service 402D1 sends an update request along with the customizable, tag-based message 300 containing the URI 402F1 of the session service 402F. The RNIC 402C of the first node 402 sends the customizable, tag-based message 300 (in serialized form) across a network, such as the network 406. See block 544. The method 500 continues to the exit terminal B.

From terminal B (FIG. 5A), the method 500 proceeds to a set of method steps 504, defined between a continuation terminal ("terminal C") and an exit terminal ("terminal D"). The set of method steps 504 describes the process by which an intermediate node processes the customizable, tag-based message with one or more references to one or more buffers (see FIGS. 5E-5F).

From terminal C (FIG. 5E), the method 500 proceeds to decision block 546 where a test is made to determine whether there is an intermediary, such the intermediary 208, that intercepts the customizable, tag-based message 300. If the answer is NO to the test at decision block 546, the method 500 proceeds to the exit terminal D. Otherwise, if the answer to the test at decision block 546 is YES, the method 500 proceeds to another decision block 548 where another test is made to determine whether the intermediary requires that the piece of information passing from buffer 402B1 to buffer 404B1 to go through it. If the answer to the test at decision block 548 is NO, the method 500 proceeds to the exit terminal D. If the answer to the test at decision block 548 is YES, the RNIC of the intermediary receives the serialized customizable, tag-based message 300 and reconstitutes it so that the customizable, tag-based message 300 can be parsed by the intermediary. In one embodiment, the RNIC need not reconstitute the customizable, tag-based message 300, but instead works directly with the serialized form. The method 500 continues to another continuation terminal ("terminal C1").

From terminal C1 (FIG. 5F), the method 500 proceeds to block 552 where the intermediary parses the head of the customizable, tag-based message 300 to find the transfer context. At block 554, the intermediary repeats processing steps 520-532 (FIGS. 5B-5C) based on the information in the transfer context to create a staging buffer such as the staging buffer 208A. Steps 520-532 are executed in the context of the intermediary. The method 500 proceeds to decision block 556 where a test is made to determine whether the customizable, tag-based message 300 is delivering information. If the answer to the test at decision block 556 is NO, the method 500 proceeds to terminal D. Otherwise, the answer to the test at decision block 556 is YES, and the method 500 proceeds to block 558 where the content of the buffer 402B1 of the previous transfer context is transferred via a suitable transferring mechanism, such as RDMA, into the staging buffer 208A of the intermediary. At block 560, the intermediary changes the header of the customizable, tag-based message 300 to include a URI of the staging buffer 208A and the transfer context created by the intermediary. The RNIC of the intermediary (not shown) sends the customizable, tag-based message 300 (in serialized form) across the network 406 toward its destination. See block 562. The method 500 continues to terminal C.

From terminal D (FIG. 5A), the method 500 proceeds to a set of method steps 506, defined between a continuation terminal ("terminal E") and an exit terminal ("terminal F"). The set of method steps 506 describes the process where a receiver service processes the customizable, tag-based message with one or more references to one or more buffers (see FIGS. 5G-5I).

From terminal E (FIG. 5G), the method 500 proceeds to block 564 where the receiver service 404D at the second node 404 receives the update request and parses the body of the customizable, tag-based message 300. At block 566, upon encountering the attribute (one that describes a buffer, such as the buffer 402B1 or the staging buffer 208A of the intermediary 208) in the body of the customizable, tag-based message 300, the receiver service 404D finds the transfer context described in the header. A test is made to determine whether the action is one of delivering information. See decision block 568. If the answer to the test at decision block 568 is YES, the method 500 proceeds to block 570 where the receiver service 404D allocates a local buffer, such as the buffer 404B1, based on the information in the transfer context. Otherwise, if the answer to the test at decision block 568 is NO, the method 500 proceeds to block 572 where the receiver service 404D locates a local buffer, such as the buffer 404B1, at the second node 404 containing the desired information. From both blocks 570, 572, the method 500 proceeds to block 574 where the receiver service 404D issues an insert request to a session manager service 404E on the second node 404. Along with the insert request is sent the transfer context obtained from the customizable, tag-based message 300.

From terminal E1 (FIG. 5H), the method 500 proceeds to block 576 where the session manager 404E receives the insert request and parses the transfer context. The session manager 404E invokes the network manager (not shown) which in turn communicates with the RNIC 404C to transfer information. A test is made to determine whether the action is one of delivering information. See decision block 580. If the answer is YES to the test at decision block 580, the RNIC 402C (or the RNIC of an intermediary if there was one that intercepted the customizable, tag-based message 300) at the other node 402 transfers information from the buffer 402B1 to the RNIC 404C at the second node 404 (which in turn transfers the information to the buffer 404B1) using the steering tag 402C2 in the transfer context without executing copy instructions from the central processing unit 402A, 404A. Otherwise, the answer to the test at decision block 580 is NO, and the method 500 proceeds to block 584, where the RNIC 404C at the second node 404 transfers information from the buffer 404B1 to the RNIC 402C at the other node 402 (or the RNIC of an intermediary if there was one that intercepted the customizable, tag-based message 300) using the steering tag 402C2 in the transfer context. From both blocks 582, 584, the method 500 proceeds to block 586 where after transferring has completed, the session manager 402E issues an insert response to the receiver service 404D. The method 500 continues to another terminal ("terminal E2").

From terminal E2 (FIG. 5I), the method 500 proceeds to block 588 where the receiver service 404D receives the insert response from the session manager service 404E and issues an update response for the sender service 402D. If between nodes 402, 404 were one or more intermediaries that had previously intercepted the customizable, tag-based message 300, the processing steps between nodes C and D are repeated to process a new customizable, tag-based message containing the insert response which then proceeds back to the sender service 402D. Eventually, the sender service 402D receives the update response from the receiver service 404D and issues a drop message to the session service 402F. See block 562. At block 564, the session service 402F terminates execution upon receiving the drop message. The method 500 continues to exit terminal F where the method 500 terminates its execution.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A message device of sending data by reference through a network, comprising:
   at least one processor;
   a local buffer configured to communicate with an external buffer residing in an external message device; and
   an RNIC component configured to facilitate transmitting a first tag-based message to the external message device, the first tag-based message including a portion retained by the local buffer and a remaining portion of the first tag-based message, wherein the RNIC component is configured to:
     understand remote direct memory access operations of the external message device; and
     conduct data transfer from the local buffer to a storage component of the external message device without the message device and the external message device executing copy instructions for the data transfer from the message device to the external message device.

2. The message device of claim 1, wherein the first tag-based message include a body element for including data, the body element of the first tag-based message including the reference to the portion of the first tag-based message retained by the local buffer.

3. The message device of claim 1, wherein the first tag-based message includes a header element for including control information.

4. The message device of claim 1, wherein the first tag-based message is sent via a customizable, tag-based protocol.

5. A method for facilitating tag-based electronic communications, comprising:
   employing a processor to execute computer executable instructions stored on a computer readable storage medium to implement the following acts:
     transmitting a first tag-based message from a local buffer residing in a local device to an external buffer residing in an external message device, the first tag-based message including a portion retained by the local buffer and a remaining portion of the first tag-based message, wherein the transmitting act includes simultaneously transmitting the remaining portion and a reference to the portion retained by the local buffer to the external message device;
     receiving a second tag-based message from the external message device, wherein the second tag-based message includes a reference to an external buffer allocated at the external message device and the second tag-based message is an insert request to initiate a transfer of the portion retained at the local buffer of the local device to the external device; and
     in response to the second tag-based message, transferring the portion retained at the local buffer of the local device to the external message device via an RNIC component, wherein the RNIC component is configured to
       understand remote direct memory access operations of the external message device; and
       conduct data transfer directly from the local buffer of the local device to the referenced external buffer of the external message device without requiring processors of the local device or the external message device to execute copy instructions of the data transfer.

6. The method of claim 5, wherein the transmitting act further comprising including a body element to the first tag-based message, wherein the reference to the portion of the first tag-based message retained by the local buffer is embedded within the body element.

7. The method of claim 5, wherein the transmitting act further comprising including a header element to the first tag-based message, wherein control information for the first tag-based message is embedded within the header element.

8. A method implemented by an intermediary for intercepting a first tag-based message from a message sender and forwarding a second tag-based message to a message receiver, the method comprising:
   employing a processor to execute computer executable instructions stored on a computer readable storage medium to implement the following acts:
      intercepting, via an RNIC at the intermediary, the first customizable, tag-based message from the message sender, wherein the first customizable, tag-based message comprises:
         a Uniform Resource Identifier (URI) of a receiver service within the message receiver;
         an address of a local buffer within the message sender where a portion of the first tag-based message is retained; and
         a steering tag for use by an RNIC of the message sender;
      parsing the first customizable, tag-based message to create a staging buffer;
      determining that the first customizable, tag-based message is delivering information;
      transferring the portion of the first tag-based message retained in the local buffer of the message sender to the staging buffer of the intermediary via an RDMA, wherein the RDMA is a transferring mechanism that contains control information pertaining to a remote direct memory access transfer session and is configured to conduct data transfer without requiring the processor of the intermediary or the message sender to execute copy instructions of data transfer;
      changing the first customizable, tag-based message into the second customizable, tag-based message, wherein the second customizable, tag-based message includes an URI of the staging buffer and a reference to the staging buffer of the intermediary where the portion of the first tag-based message is retained;
      sending the second customizable, tag-based message to the message receiver;
      receiving an insert request from the message receiver, wherein the insert request includes a reference to a buffer allocated at the message receiver to initiate a transfer of the portion retained at the staging buffer of the intermediary to the message receiver; and
      in response to the insert request, transferring the portion retained at the staging buffer of the intermediary to the message receiver via an RNIC component, wherein the RNIC component is configured to:
         understand remote direct memory access operations of the message receiver; and
         conduct data transfer directly from the staging buffer of the intermediary to the referenced buffer of the message receiver without requiring processors of the intermediary or the message receiver to execute copy instructions of the data transfer.

9. A method of claim 8, wherein the first customizable, tag-based message includes a header element that contains the reference to the first buffer, the header element further containing an attribute that is associated with the reference to the first buffer.

10. A method of claim 8, wherein the first customizable, tag-based message includes a body element that uses the attribute to refer to the first buffer.

11. A method of claim 8, wherein the first customizable, tag-based message further comprises a data structure comprising:
   a header tag that is indicative of control information, the header tag including a service tag that is indicative of a service for representing the local buffer of the message sender, the service tag including a URI attribute that is indicative of a URI of the service representing the local buffer of the message sender and an identifier attribute that is associated with the service tag; and
   a body tag that is indicative of data information, the body tag being capable of using the identifier attribute to refer to service representing the first buffer of the message sender.

12. A method of claim 11, wherein the data structure further comprises a host tag that is indicative of a host at which the local buffer resides.

13. A method of claim 11, wherein the data structure further comprises a port tag that is indicative of a network port through which network communication occurs.

14. A method of claim 11, wherein the data structure further comprises a contract tag that is indicative of a contract for defining one or more behaviors of the service representing the local buffer.

15. A method of claim 11, wherein the steering tag is indicative of a steering tag associated with a physical address of the local buffer and a length tag that is indicative of the length of the local buffer.

16. One or more computer readable medium having stored thereon a plurality of instructions that, when executed by a computing device having one or more processors, causes the one or more processors to execute the method as recited in claim 8.

17. A method implemented by a message receiver for receiving a customizable, tag-based message, the method comprising:
   employing a processor of the message receiver to execute computer executable instructions stored on a computer readable storage medium to implement the following acts:
      receiving the customizable, tag-based message from a message sender, the customizable, tag-based message comprising:
         a steering tag indicative of a physical address of the local buffer of the message sender where a portion of the customizable, tag-based message is retained; and
         a length tag indicative of the length of the local buffer of the message sender;
      allocating size of a local buffer within the message receiver for the portion of the customizable, tag-based message retained at the message sender to be transferred; and
      causing the portion of the customizable, tag-based message retained within the message sender to be transferred to the local buffer of the message receiver via an RDMA, wherein the RDMA is a transferring mechanism that contains control information pertaining to a remote direct memory access transfer session and is configured to conduct data transfer without requiring the processors of the message receiver or the message sender to execute copy instructions of transferring the retained portion of the customizable, tag-based message from the message sender to the message receiver.

18. A method of claim 17, wherein a session service is engaged at the message sender to associate the address of the local buffer of the message sender with the steering tag.

19. A method of claim 18, wherein a session manager service is engaged to create the session service and to destroy the session service once the data transfer is completed.

20. A method of claim 19, wherein the customizable, tag-based message is originated by a sender service, and wherein the sender service invokes the session manager service to initiate the transfer of the information.

21. A method of claim 18, wherein the customizable, tag-based language includes associating the steering tag with a URI of the session service.

22. One or more computer readable medium having stored thereon a plurality of instructions that, when executed by a computing device having one or more processors, causes the one or more processors to execute the method as recited in claim 17.

* * * * *